July 6, 1954
R. E. BROWN
2,683,202
VARIABLE RESISTANCE DEVICE
Filed April 2, 1953
2 Sheets-Sheet 1
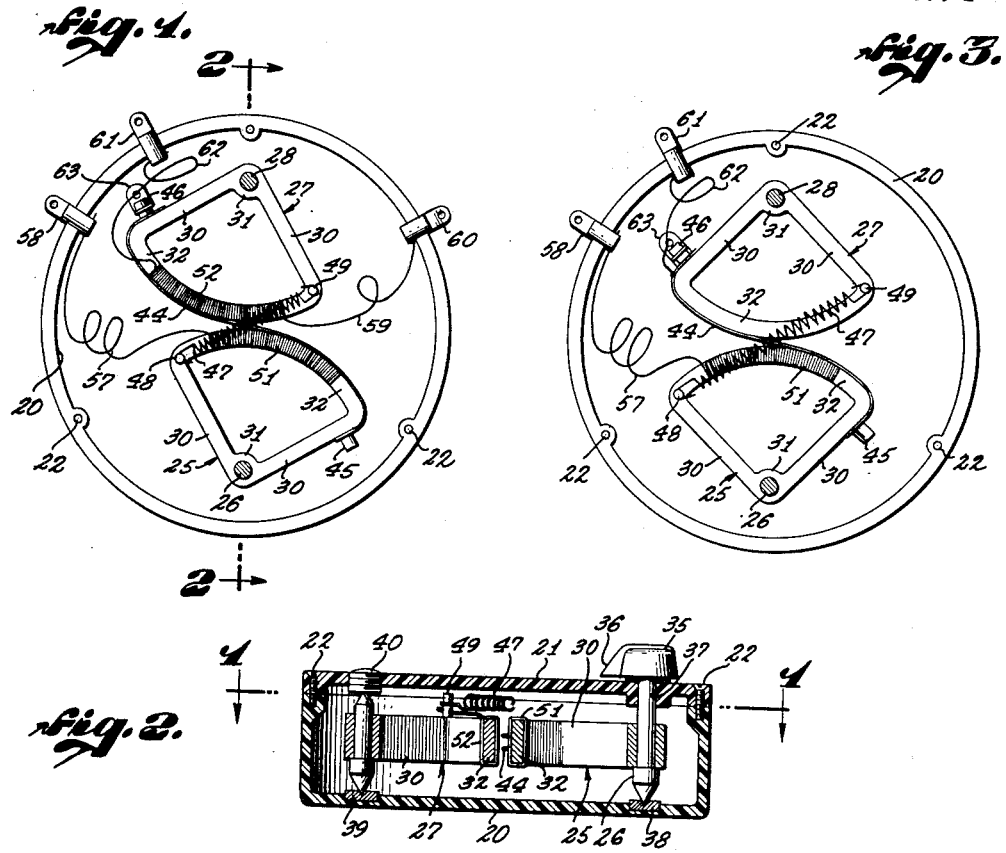
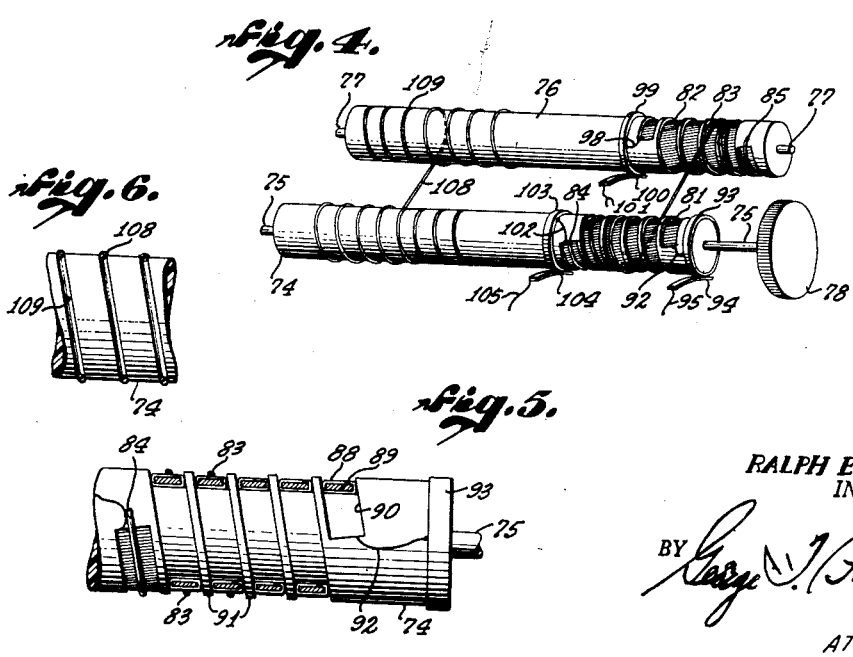
RALPH E. BROWN,
INVENTOR.
BY *George W. Smyth*
ATTORNEY.

July 6, 1954     R. E. BROWN     2,683,202
VARIABLE RESISTANCE DEVICE
Filed April 2, 1953     2 Sheets-Sheet 2
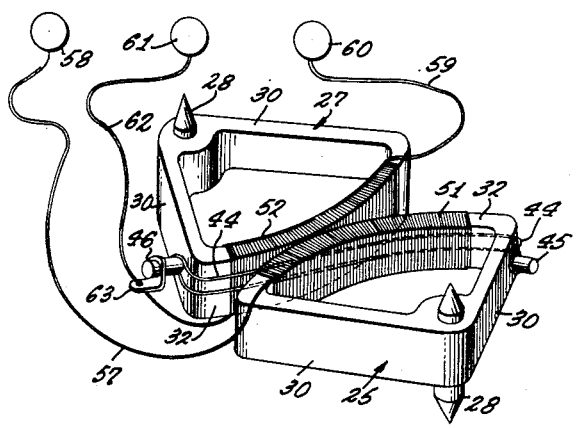
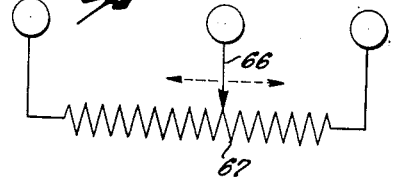
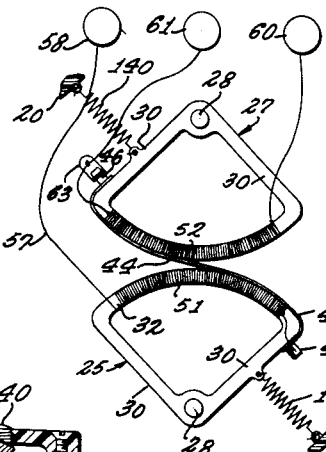
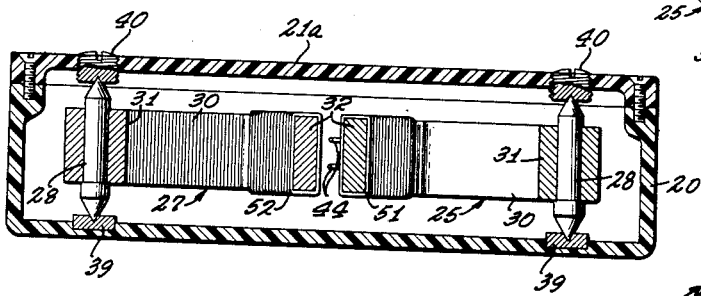
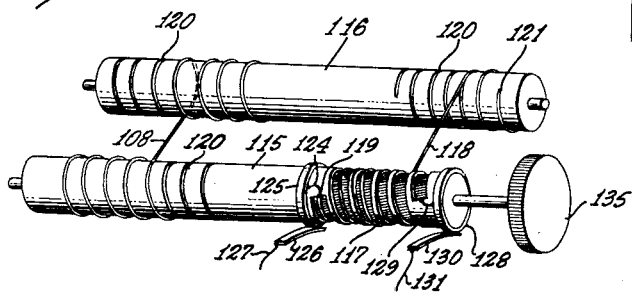
RALPH E. BROWN,
INVENTOR.
BY *George J. Smyth*
ATTORNEY.

Patented July 6, 1954

2,683,202

UNITED STATES PATENT OFFICE 2,683,202

VARIABLE RESISTANCE DEVICE

Ralph E. Brown, Los Angeles, Calif., assignor to Genisco, Inc., Los Angeles, Calif., a corporation Application April 2, 1953, Serial No. 346,351

31 Claims. (Cl. 201—59)

This invention relates to potentiometers, voltage dividers, rheostats and similar variable resistance devices for various uses including use in instruments, measuring devices, and control systems.

The utility of the invention resides not only in its basic purpose of providing variable resistance in an electric circuit, but also, and more important, in the fact that it eliminates certain disadvantages that are inherent in prevailing types of variable resistance devices that incorporate a wiper movable along a resistor. Conflicting considerations arise in the construction of such a device because, on the one hand, the movable wiper must exert appreciable pressure against the co-acting resistor to maintain electrical communication between the wiper and resistor, and, on the other hand, the greater the wiper pressure provided to insure continuous electrical communication, the greater the wear of both the wiper and the resistor and the greater the actuating force required to move the wiper. Another conflict is found in the fact that a relatively small area of mutual contact between the wiper and resistor is usually desirable to minimize wear, but the smaller the area of mutual contact, the greater the possibility that the wiper will be isolated by a minute dead spot on the resistor or by an intervening particle of non-conducting foreign material.

The present invention resolves both these conflicts, completely eliminates the usual rubbing friction created by a wiper, avoids the usual causes of wear along the resistor, minimizes the required actuating force, and practically eliminates any possibility of circuit interruption arising from failure of the wiper to maintain contact with the resistor.

Basically, all of these advantages are accomplished by providing a first rotary member with a flexible conductor connected thereto for wrapping contact with its periphery, a second movable member to feed or take up the conductor according to the direction of rotation of the first member, these three elements being in combination with a resistor positioned on one of the two members to be progressively shorted or viceversa when the two members move to shift the flexible conductor. To use this combination as a simple rheostat, it is merely necessary to connect the conductor and the resistor into the circuit that is to be controlled. An important feature of the invention is that the resistor may be on the rotary member, as distinguished from the second take up member, and may be wound spirally thereon. Thus the resistor may be wound around the rotary member with any number of spiral turns to provide resistance progressively variable over any number of revolutions of the rotary member. By virtue of such an arrangement, the range of resistance variation is not limited to 360 degrees of rotation of the rotary member.

When the invention is embodied in a voltage-dividing potentiometer, the combination includes two resistors, one being on the periphery of the first rotary member and the other being mounted on the second member. Preferably the second member is also a rotary member. Thus each of the two rotary members alternately serves as means to feed out the flexible conductor, or to take up the flexible conductor according to its direction of rotation. The two rotary members rotate simultaneously and may be arranged either to rotate in the same direction, or to rotate simultaneously in opposite directions. Here again a feature of the invention is that the two rotary members may be of cylindrical configuration with the corresponding resistor wound thereon to form a plurality of spiral turns so that the change in resistance may extend progressively over more than 360 degrees of rotation of the two rotary members.

A further advantage of the invention is that it is especially suitable for embodiment in an accelerometer as will be explained. The various features and advantages of the invention will be apparent in the following detailed description considered with the accompanying drawing.

In the drawings, which are to be regarded as merely illustrative:

Figure 1 is a sectional view taken along the line 1—1 of Figure 2, illustrating one embodiment of the invention as a voltage dividing potentiometer;

Figure 2 is a diametrical section taken as indicated by the line 2—2 of Figure 1;

Figure 3 is a fragmentary view similar to Figure 1 showing how the construction may be modified to provide a simple variable resistor as distinguished from a voltage divider;

Figure 4 is a simplified perspective view of the essential mechanism of the invention embodied as a voltage dividing device having a range of progressive resistance variation extending over several rotations;

Figure 5 is a fragmentary longitudinal sectional view showing the construction at one end of one of the rotary members shown in Figure 4;

Figure 6 is a similar fragmentary sectional view showing the construction at the other end of the rotary member;

Figure 7 is a view similar to Figure 4, showing a rotary variable resistance device as distinguished from a voltage divider, the variable resistance device providing a progressive resistance change extending over several rotations of the device;

Figure 8 is a perspective view of the essential parts of the invention as embodied in an accelerometer;

Figure 9 is a plan view of the accelerometer mechanism shown in Figure 8;

Figure 10 is a sectional view of the complete accelerometer including the accelerometer housing;

Figure 11 is a wiring diagram of the basic voltage dividing arrangement found in some of the foregoing illustrated embodiments of the invention; and Figure 12 is wiring diagram of a variable resistance arrangement found in the other embodiments.

The embodiment of the invention illustrated in Figures 1 and 2 comprises a potentiometer of the voltage-dividing type. The potentiometer is housed in a suitable casing comprising a shallow cylindrical shell 20 and a circular cover plate 21 attached thereto by suitable screws 22. This casing may be made of any suitable material, but preferably will be made of a non-conducting plastic.

Suitably mounted inside the described casing is a pair of movable members interconnected by a flexible conductor in such manner that simultaneous movement of the two members causes the conductor to peel off of one and to wrap onto the other with consequent variable shorting of resistor means mounted on the periphery of at least one of the two members. In this instance, it is contemplated that both of the members will be rotary and a feature of the specific construction shown in the drawings is the use of segmental rotary members by virtue of which the device may be relatively compact.

As best shown in Figure 1 the two rotary members comprise a segmental member, generally designated 25, mounted on a pivot pin 26 and a second similar segmental member, generally designated 27, mounted on a second pivot pin 28. Preferably each of the segmental members 25 and 27 is of open construction comprising a pair of arm portions 30 extending from a hub portion 31 and an arcuate portion 32 interconnecting the outer ends of the two arm portions.

It is contemplated that the two rotary members 25 and 27 will be operatively interconnected for simultaneous rotation in opposite directions and various mechanical interconnections may be employed for this purpose in various practices of the invention. With the two rotary members operatively interconnected, they may be rotated in unison by actuating force applied to only one of the members. Such actuating force may be applied manually or may be applied automatically, for example, when the potentiometer is a component of an automatic control system. For the purpose of illustration, the potentiometer shown in Figures 1 and 2 is controlled manually by a knob 35 which may be formed with a radial point 36 for reference to a suitable arcuate scale (not shown) on the exterior of the cover 21.

The manually operable knob 35 is mounted on the outer end of the pivot pin 26, the pivot pin being journaled in a bore 37 in the cover 21 and the inner end of the pivot pin being pointed as shown and journaled in a suitable bearing or socket member 38 in the bottom of the shell 20. The second pivot pin 28 carrying the second rotary member 27, is pointed at both ends, being journaled at its lower end in a socket member 39 in the bottom of the shell 20 and being journaled at its upper end in an adjustable socket member 40 in the form of a screw mounted in the cover 21.

In accord with the underlying concept of the invention, the two rotary members 25 and 27 are interconnected by a flexible conductor 44 in such manner that the flexible conductor lies against the peripheries of both rotary members. In the particular construction shown, the flexible conductor 44 is in the form of a loop of extremely flexible wire with one end of the loop engaging a lug 45 on the rotary member 25 and the other end of the loop engaging a similar lug 46 on the second rotary member 27.

A feature of this particular embodiment of the invention is the concept of providing suitable yielding means to interconnect the two rotary members 25 and 27 in opposition to the flexible conductor 44. Thus, as best shown in Figure 1, the two rotary members may be interconnected by a coiled spring 47, one end of which is anchored to a lug 48 on the rotary member 25, the other end of which is anchored to a similar lug 49 on the second rotary member 27. The spring 47 not only co-operates with the flexible conductor 44 for the purpose of operatively interconnecting the two rotary members 25 and 27, but also serves as means to maintain the flexible conductor constantly under tension thereby eliminating backlash.

It is to be noted that with the parts constructed and arranged as indicated in Figure 1, the length of the coiled spring 47 does not vary significantly over the operative range of rotation of the two rotary members 25 and 27, consequently, the coiled spring does not have any troublesome tendency to urge two rotary members to any particular relative positions. Thus, the two rotary members tend to remain in whatever position to which they are moved by the knob 35.

Two suitable resistors 51 and 52, respectively, are mounted on the two rotary segmental members 25 and 27, respectively, each of the resistors comprising a suitable coated wire wound on the arcuate portion 32 of the segmental member. Sufficient coating is removed to expose the metal of the successive wire turns to the flexible conductor 44. With this arrangement the flexible conductor 44 contacts and shorts an end portion of each resistor and the proportion of each resistor shorted in this manner varies with the simultaneous rotation of the two segmental members, one shorted portion increasing and the other one decreasing or vice versa. It is contemplated that the other ends of the two resistors 51 and 52 that are not shorted by the conductor 44 will be adapted for connection to an electric circuit. For this purpose an ample length of wire 57 connects the resistor 51 with a terminal member 58 that extends to the exterior of the casing and a second similar wire 59 connects the second resistor 52 with a similar terminal 60.

The conductor 44 may be directly connected to a third terminal member 61, or the same purpose may be served by connecting the shorted end of one of the resistors 51 and 52 to the third terminal member. Thus Figure 1 shows a wire 62 extending from the shorted end of the resistor 52 to the third terminal member 61, the wire being connected at an intermediate point to a metal clip 63 on the lug 46. If desired, the lug 46 may be in the form of a metal pin so that the conductor 44 will also be in electrical communication with the wire 62 through the metal of the pin and the metal of the clip 63.

It will be apparent to those skilled in the art that if the two resistors 51 and 52 are matched and if they are so positioned relative to each other that at the position of the parts shown in Figure 1 the shorted portions are equal, the action of the potentiometer will be equivalent to the action of a conventional voltage divider represented by the wiring diagram in Figure 11. In Figure 11 the brush or movable contact 66 that traverses the resistor 67 corresponds to the flexible conductor 44 and the resistor 67 corresponds to the sum of the two portions of the resistors 51 and 52 that are not shorted by the conductor 44.

Figure 3 shows how the device of Figures 1 and 2 may be modified to serve as a simple variable resistance device. The construction is largely the same as in Figures 1 and 2 as indicated by the use of corresponding numerals to designate corresponding parts. The resistor 52 is omitted along with the corresponding wire 59 and corresponding terminal 60. The wire 62 is connected directly to the flexible conductor 44. Simultaneous rotation of the two segmental members 25 and 27 causes the conductor 44 to progressively increase or progressively decrease the proportion of the single resistor 51 that it shorts. This arrangement is equivalent to the conventional rheostat circuit shown in Figure 21 in which a movable contact or brush 68 traverses a resistor 69.

Figures 4, 5 and 6 show how a pair of resistors may be wound spirally on a pair of cylindrical rotary members to permit the range of operation of a voltage divider to be extended without limit. A cylindrical rotary member 74 of non-conducting material, having a pair of suitably journaled trunnions 75, is positioned substantially parallel to a second cylindrical rotary member 76, having a pair of trunnions 77. It is contemplated that the two cylindrical members 74 and 76 will be operatively interconnected for rotation in unison and that suitable actuating means will be provided, for example, an operating knob 78 connected to one of the trunnions 75.

A resistor 81 is wound spirally on the cylindrical member 74, a second resistor 82 is wound spirally on the second cylindrical member 76 and a flexible conductor 83 is spirally wound on the spiral windings of the two resistors in such manner as to unwind from one resistor and to wind onto the other resistor when the two cylindrical members are rotated in unison. One end of the flexible conductor 83 is connected to one end of the resistor 81 as indicated at 84 and the other end is connected to the resistor 82 as indicated at 85.

Preferably each of the two resistors 81 and 82 is in the form of a coated wire 88 wound on a core 89 that is in the form of flat strip as best shown in Figure 5, the coating being removed from the wire on the periphery of the resistor to permit conducting contact with the flexible conductor 83. In the construction shown, the portion of each of the cylindrical members 74 and 76 on which the corresponding resistor is mounted, is cut away to form a helical groove 90 and a narrow helical rib 91, the groove serving to seat the resistor and the rib serving as means to keep the flexible conductor 83 from shifting away from a helical turn of the resistor.

Suitable provisions are made to connect the free ends of the resistors 81 and 82 and the flexible conductor 83 into an electric circuit. For this purpose the free end of the resistor 81, i. e. the end that is not shorted by the conductor 83, is connected by a wire 92 to a slip ring 93 on the cylindrical member 74, and a stationary brush 94 in contact with the slip ring 93 is connected by a wire 95 to a suitable terminal (not shown) of the potentiometer. In like manner, the free end of the resistor 82 is connected by a wire 98 to a slip ring 99 on the cylindrical member 96 and a stationary brush 100 in contact with the slip ring 99 is connected by a wire 101 with a second potentiometer terminal (not shown). The flexible conductor 83 may be connected by a wire 102 to a third slip ring 103 on the cylindrical member 74 with a brush 104 in contact with the slip ring 103, the brush being connected to a third potentiometer terminal (not shown) by means of a wire 105.

While the two rotary cylindrical members 74 and 76 may be operatively connected in any suitable manner for simultaneous rotation in response to rotation of the operating knob 78, preferably the operative interconnection is provided by a flexible member 108 in co-operation with the flexible conductor 83. The flexible member 108 is wound on the two cylindrical members 74 and 76 in a manner opposite to the winding of the flexible conductor 83 so that when the knob 78 is rotated clockwise as viewed in Figure 4, the flexible conductor 83 will act in tension to transmit actuating force to the cylindrical member 76 and, on the other hand, when the cylindrical member 74 is rotated counterclockwise, the actuating force will be transmitted to the second cylindrical member 76 through the flexible member 108. For this purpose the flexible member 108 is spirally wrapped around the first cylindrical member 74 in a direction to unwind when the flexible conductor 83 winds on the same cylindrical member and is wrapped around the second cylindrical member 76 to unwind when the flexible conductor winds onto the second cylindrical member.

Preferably each of the two cylindrical members is formed with a helical guide groove 109 to receive the flexible member 108, the inner diameter of the helical guide groove being substantially the same as the outer diameter of the helically wound resistors 81 and 82. The opposite ends of the flexible member 108 may be anchored to the cylindrical members 74 and 76, respectively, as indicated at 110 and 111. Preferably the member 108 is elastic and is continuously stressed in tension thereby to maintain the flexible conductor 83 in tension with consequent elimination of backlash. For example, the member 108 may be a multiple strand pre-twisted nylon cord.

It may be readily understood by those skilled in the art that the described arrangement shown in Figures 4, 5 and 6 is equivalent to the voltage dividing circuit shown in Figure 11. Figure 7 shows how one of the two resistors in Figure 4 may be omitted to make the arrangement equivalent to the simple rheostat circuit shown in Figure 12.

Figure 7 shows two spaced rotary cylindrical members 115 and 116 with a resistor 117 wound helically on the cylindrical member 115 in the manner heretofore described. A flexible conductor 118 is wound onto the resistor 117 and is connected to one end of the resistor as indicated at 119. The flexible conductor 118 is wound helically on the second cylindrical member 116 in a helical groove 120 and is anchored to the second cylindrical member as indicated at 121. One end of the resistor 117, as well as the corresponding end of the flexible conductor 118, is connected by a wire 124 to a slip ring 125 and a brush 126, co-operating with the slip ring, is connected by a wire 127 to a suitable terminal (not shown). In like manner, the other end of the resistor 117 is connected to a slip ring 128 by a wire 129 and a brush 130 adjacent the second slip ring is connected by a wire 131 to a second terminal (not shown).

Any suitable means may be employed to operatively interconnect the two cylinders 115 and 116 and the two cylinders may be actuated, for example, by an operating knob 135 connected to the cylindrical member 115. Preferably the required operative interconnection between the two cylindrical members is accomplished by providing a flexible member 108 to cooperate with the flexible conductor as heretofore described, the flexible member being preferably guided by the usual helical grooves 120 in the two cylindrical members.

The purpose of Figures 8, 9 and 10 is to indicate how the principles of the invention may be embodied, with outstanding advantages, in an accelerometer. The general arrangement of the accelerometer is similar to the arrangement shown in Figures 1 and 2, as indicated by the use of corresponding numerals to indicate corresponding parts. The construction differs only in the actuating means and in the substitution of a pair of opposed springs 140 for the single spring 47.

The rotary segmental member 25, like the rotary segmental member 27, is mounted on a pin 28 that is pointed at both ends and is journaled in a lower socket member 39 in the shell 20 and an upper socket member 40 in the form of a screw threaded into the cover 21a. Each of the two springs 140 is fixedly anchored to the shell 20 at one end and at its other end is connected to the corresponding rotary segmental member 25 or 26, the two springs being in opposition to place the flexible conductor 44 under tension.

It will be readily apparent that the two springs 140 will cause the two rotary segmental members 25 and 27 to seek a neutral equilibrium position shown in Figure 9 with the two springs in static balance with each other. Since the centers of gravity of the two segmental members are offset from the axes of rotation, being located substantially on the line interconnecting the two pivot pins 28, it is apparent that the two segmental members will respond by rotary displacement to acceleration forces. The maximum response of the two rotary members will be to forces perpendicular to the line interconnecting the two pivot pins. The magnitude of displacement of the two segmental members will be accurately reflected in the change in proportions of the two resistors 51 and 52 that are shorted by the flexible conductor 44.

All forms of the invention are characterized by the use of a flexible conductor that makes wiping contact instead of frictional sliding contact with a co-operating resistor. Consequently all forms of the device are advantageous in requiring exceptionally small operating force and in operating with minimum wear. The fact that the flexible conductor makes contact with each of the two resistors at multiple points closely spaced together insures continuous electrical communication between the flexible conductor and the two resistors.

My description and specific detail of selected embodiments of the invention for the purpose of illustration of the underlying principles will suggest to those skilled in the art various changes, substitutions and other departures from my disclosure that properly lie within the spirit and scope of the appended claims.

I claim:

1. In a variable resistance device of the character described, the combination of: a first member adapted to rotate about an axis therethrough; a flexible conductor having one end connected to said member for progressive wrapping contact with the periphery thereof when the member rotates in one direction and to peel progressively out of contact with the periphery when the member rotates in the opposite direction; a second member connected to the other end of said conductor and movable to feed the conductor to the first member when the first member rotates in one direction and to take up the conductor progressively when the first member rotates in the opposite direction; and a resistor on one of said members positioned to be progressively shorted by said conductor when said first member rotates in one direction and vice versa, said flexible conductor and said resistor being adapted for connection with an electric circuit.

2. A device as set forth in claim 1 in which said resistor is mounted on the periphery of said rotary member and extends in a generally circumferential direction.

3. A device as set forth in claim 1 which includes yielding means to maintain said flexible conductor under tension.

4. A device as set forth in claim 3 in which said yielding means interconnects said two members in opposition to said flexible conductor.

5. In a variable resistance device of the character described, the combination of: two spaced rotary members adapted to rotate simultaneously, at least one of said two rotary members having a peripheral resistor; and a flexible conductor extending from the periphery of one of said rotary members to the periphery of the other in peripheral contact with said resistor for variable shorting thereof, whereby simultaneous rotation of said two members causes said conductor to peel off the periphery of one of the members and to make progressively increasing wrapping contact with the periphery of the other, thereby to progressively vary the proportion of said resistor that is shorted by the conductor, said resistor and conductor being adapted for connection with an electric circuit.

6. A device as set forth in claim 5 which includes yielding means connected to said two rotary members to maintain said conductor in tension.

7. A device as set forth in claim 6 in which said yielding means interconnects said two members in opposition to said flexible conductor.

8. A device as set forth in claim 7 in which said yielding means is in wrapping contact with said two members in a manner opposite to the wrapping contact of said flexible conductor.

9. A device as set forth in claim 5 which includes two yielding means connected to said two rotary members respectively, with the two yielding means in opposition to urge said two rotary members to positions of equilibrium with said yielding means in balance with each other.

10. A device as set forth in claim 5 in which said two spaced rotary members are of the configuration of a segment of a circle, each being pivotally mounted for rotation about its axis of curvature.

11. A combination as set forth in claim 5 in which at least one of said two rotary members has its center of gravity offset from its axis of rotation whereby the member responds to acceleration and which includes yielding means to hold said acceleration-responsive member in a normal neutral position.

12. In a variable resistance device of the character described, the combination of: two spaced rotary members, at least one of said rotary members having a peripheral resistor; a flexible conductor extending from the periphery of one of said rotary members to the periphery of the other, in peripheral contact with said resistor whereby simultaneous rotation of the two members causes said conductor to wrap progressively against said resistor and simultaneous rotation in the other direction causes the conductor to peel off said resistor thereby to progressively vary the proportion of the resistor shorted by the conductor, said resistor and conductor being adapted for connection with an electric circuit; and a flexible member interconnecting the peripheries of said two rotary members in wrapping contact therewith opposite with respect to the wrapping contact by said conductor, whereby the conductor and flexible member co-operate to operatively interconnect the two members so that rotation of one member is transmitted to the other member.

13. A device as set forth in claim 12 in which said flexible member is a longitudinally yieldable member under tensile stress to place said conductor under tension for the elimination of backlash.

14. In a variable resistance device of the character described, the combination of: two spaced rotary members; two corresponding resistors mounted on the peripheries of said two members respectively and extending in generally circumferential directions thereon; and a flexible conductor having its opposite ends connected to said members respectively in contact with said resistors respectively for progressive wrapping contact from one end of each resistor towards the other end of the resistor and for alternate peeling action in the direction from said other end towards said one end of the resistor whereby simultaneous rotation of the two rotary members progressively varies the proportion of each resistor shorted by the conductor, said conductor and said other ends of said resistors being adapted for connection with an electric circuit.

15. A device as set forth in claim 14 which includes yielding means to maintain said flexible conductor under tension.

16. A device as set forth in claim 15 which includes yielding means connected to both of said rotary members.

17. A device as set forth in claim 16 in which said yielding means interconnects said two rotary members in opposition to said conductor.

18. A combination as set forth in claim 14 which includes a flexible member interconnecting the two rotary members in opposition to said flexible conductor and co-operating with the flexible conductor to operatively interconnect the two rotary members.

19. A device as set forth in claim 18 in which said flexible member is a longitudinally resilient member under tensile stress.

20. A device as set forth in claim 14 in which said two rotary members have their centers of gravity offset from their axes of rotation for response to acceleration forces applied to the device and which includes means to yieldingly bias said two rotary members to normal neutral positions.

21. In a variable resistance device of the character described, the combination of: a cylindrical rotary member; a resistor wrapped around the periphery of said rotary member and forming a plurality of spiral turns thereon; a flexible conductor having one end connected to said rotary member in wrapping contact with said resistor to follow said spiral turns for shorting a variable portion of the resistor; and take up means to feed said conductor to said rotary member when the member rotates on one direction and to peel off the conductor when the rotary member rotates in the opposite direction, said resistor and said conductor being adapted for connection with an electric circuit.

22. A device as set forth in claim 21 which includes yielding means to maintain said flexible conductor under tension.

23. A device as set forth in claim 22 in which said take-up member is a second rotary cylindrical member with said flexible conductor wound thereon.

24. A device as set forth in claim 23 which includes a flexible member wound on said two cylindrical members in an opposite manner from said conductor to co-operate with the conductor for operatively interconnecting the two members for simultaneous rotation.

25. A device as set forth in claim 24 in which said flexible member is longitudinally resilient and is stressed in tension to maintain said conductor under tension thereby to eliminate backlash.

26. In a variable resistance device of the character described, the combination of: two rotary cylindrical members; two corresponding resistors, each wound around the periphery of the corresponding cylindrical member to form a plurality of spiral turns thereon; a flexible conductor having its opposite ends connected to said two rotary cylindrical members respectively in wrapping contact with both said resistors to follow the spiral turns thereof for shorting variable portions of the two resistors whereby simultaneous rotation of the two cylindrical members in one respect increases one of said portions and decreases the other portion, and rotation in the opposite respect decreases said one portion and increases said other portion, said conductor and said two resistors being adapted for connection with an electric circuit.

27. A device as set forth in claim 26 which includes yielding means to maintain said conductor in tension.

28. A device as set forth in claim 26 in which at least one of said two cylindrical members has a spiral groove to receive said conductor.

29. A device as set forth in claim 26 which includes means to actuate one of said two cylindrical members and in which the two cylindrical members are operatively interconnected for actuation of the other cylindrical member.

30. A device as set forth in claim 29 which includes a flexible member wound on said two rotary members in opposite respect to said flexible conductor to co-operate with the flexible conductor for operatively connecting the two cylindrical members together.

31. A device as set forth in claim 30 in which said flexible member is a longitudinally resilient member under stress to maintain said flexible conductor in tension.